Patented July 23, 1940

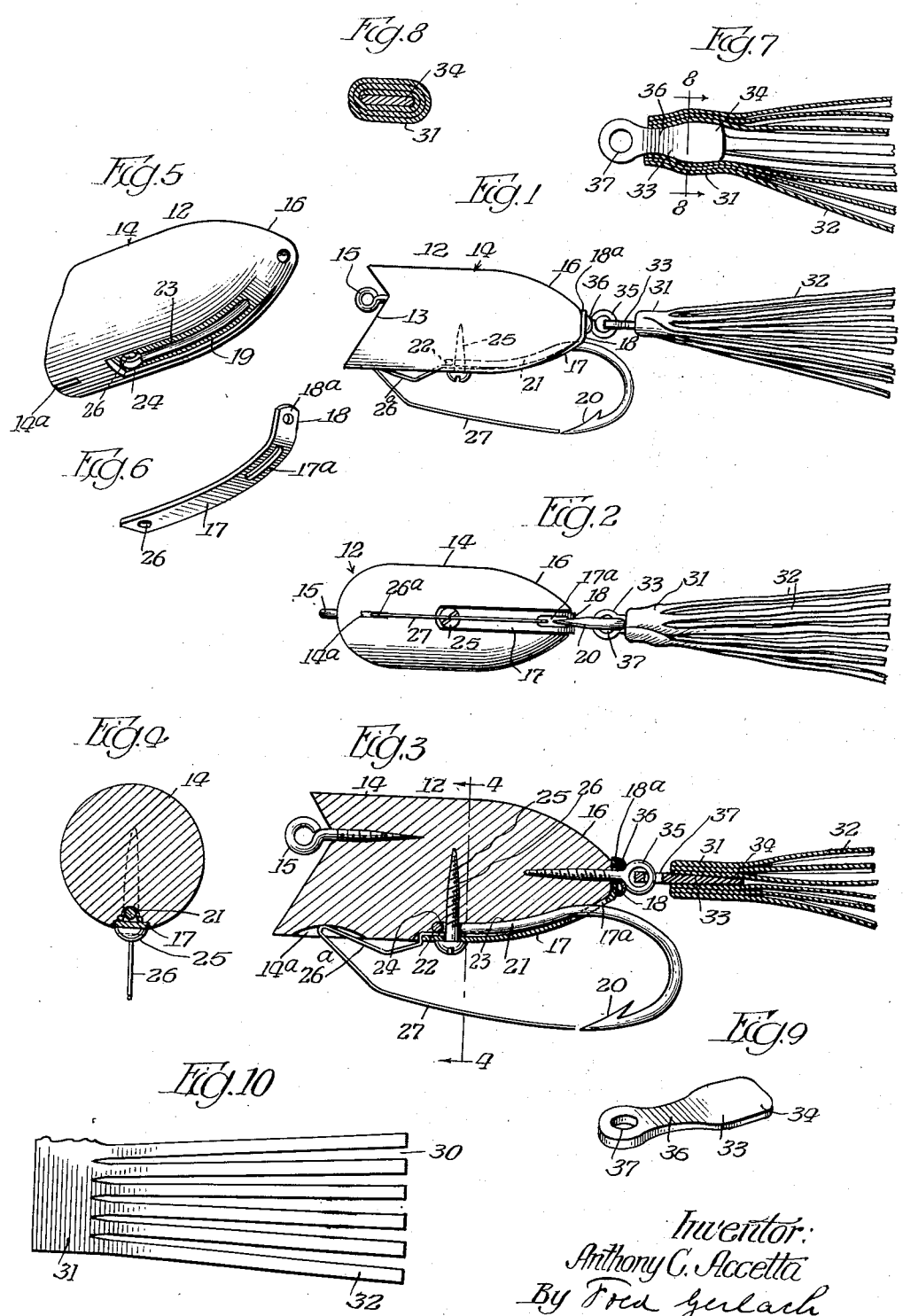

2,208,827

UNITED STATES PATENT OFFICE 2,208,827

ARTIFICIAL FISH LURE

Anthony C. Accetta, Cleveland, Ohio

Application January 29, 1940, Serial No. 316,131

8 Claims. (Cl. 43—42)

The invention relates to artificial fish lures.

One object of the invention is to provide an improved lure of the type which includes a body or plug with an underlying keel-strip which secures the hook to the plug and serves as a weight for holding the hook in a downstanding position so the lure will ride through the water.

Another object of the invention is to provide an improved detachable tail-piece for the plug. Other objects will appear from the following detailed description.

The invention consists in the several novel features which are hereinafter set forth and are more particularly defined by claims at the conclusion hereof.

In the drawing: Fig. 1 is a side elevation of a lure embodying the invention. Fig. 2 is an inverted plan. Fig. 3 is a central vertical longitudinal section. Fig. 4 is a section on line 4—4 of Fig. 3. Fig. 5 is a detail perspective of the body. Fig. 6 is a detail perspective of the keel. Fig. 7 is a horizontal section through the tail-piece. Fig. 8 is a section taken on line 8—8 of Fig. 7. Fig. 9 is a perspective of the plate on which the tail-strip is wound. Fig. 10 is a detail of the elastic strip used to form the tail-piece.

The invention is exemplified in a lure comprising a plug or body 12, which is usually formed of wood or other suitable light material, and is provided with a transverse V-shaped front end 13 for producing wabbling movement as the lure is traveling through the water. A screw-eye 15 is connected to the front end of the bait for connecting the plug to a fishline. The front portion 14 of the plug is cylindrical and its rear end is tapered, as at 16.

A keel or strip of flat metal is secured to the bottom portion of the plug and comprises a portion 17 which is shaped to conform to the periphery of cylindrical portion 14 and tapered portion 16 of the plug and an upturned terminal 18 which fits against the rear end of the plug. The portion 17 of the keel fits in a flat bottomed recess 19 which is formed in the plug so the outer face of the keel is substantially flush with the periphery of the plug. A fishhook which comprises a point 20, a shank 21 and an eye 22, is removably secured to the plug. The shank 21 of the hook fits in a groove 23 which is formed in the bottom of the recess 19 and the eye of the hook fits in a socket 24 at the front end of groove 23. A screw 25 extends through a hole 26 in the front end of the keel and into the plug to secure the keel to the plug and in the groove 19. The plate underlies the shank and eye of the hook and confines them in the groove 23 and socket 24, so that the point of the hook will extend downwardly from, and ride below, the plug, and will be rigidly secured against lateral movement. The keel is provided with a slot 17a through which the rear portion of the hook can be passed before securing the hook to the plug. A weed-guard formed of resilient wire is removably secured to the underside of the plug and provided with an eye through which screw 25 is adapted to pass. The eye of the weed-guard is clamped between the front end of the keel and the eye 22 of the hook when the keel is secured by screw 25 in recess 23. The weed-guard comprises a downwardly arched forwardly extending member 26a and a rearwardly extending resilient member 27 which extends from the front end of the arched member 26 to the point of the hook. The front end of the guard fits into a groove 14a in the plug. This exemplifies a lure in which is a keel or strip which underlies the plug and is adapted to balance the plug so it will ride through the water with the hook extending downwardly and which also serves to rigidly secure the downwardly extending hook to the plug so the hook will be maintained in its downwardly extending position while the hook rides through the water in trolling or casting.

The lure is usually provided with a tail for attracting the fish. The improved tail is formed of a sheet of elastic material such as soft rubber which comprises a connecting portion 31 at its front end. The sheet is slotted longitudinally, as at 30, rearwardly of portion 31 to provide flexible lashes 32 which are free to wiggle as the bait travels through the water. The portion 31 of the tail-strip is wrapped and cemented around a plate 33 which comprises a transversely extending rear flat member 34, an eye 35 at its front end, and an intermediate portion 36 of reduced width. The eye 36 is provided with a hole 37 for the shank of screw-eye 35, by which the plate 33 is removably and pivotally connected to the rear end of the plug. The shank of screw-eye 35 passes through hole 18a in the rear upstanding end 18 of keel 17. The portion 31 of the tail is wrapped and stretched around the reduced portion 36 and the front of member 34. The front end of the enlarged portion 34 forms a shoulder to assist in securing the tail to plate 33. The plate 33 extends transversely for preventing rotation of the lure on its longitudinal axis. A washer 38 is interposed between the eye 35 and the rear end 18 of the keel. The screw-eye 35 permits different attractions, such as feathers, pork rind strips, or bucktails to be substituted for the rubber tail illustrated.

The invention exemplifies a lure comprising a plug formed of light material, such as wood, and a keel-plate extending along the bottom and to the rear of the plug and which will secure the hook to the plug so that the hook will at all times ride downwardly in the water. The keel being confined in a recess, conforms to the periphery of the plug to cause the latter to ride smoothly through the water and also serves to cover and secure the hook to the plug. The improved tail-piece provides a series of lashes which have a tendency to diverge rearwardly as an attraction for the fish, and which will not produce rotation of the plug.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In an artificial fish lure, the combination of a plug, a longitudinally extending keel on the bottom of the plug, a fishhook having a shank and eye fitting between the keel and the plug and extending through the keel and having a point, and a screw extending through the keel and the eye of the hook for removably securing the keel and the hook to the plug.

2. In an artificial fish lure, the combination of a plug, a longitudinally extending keel on the bottom of the plug and having an upstanding rear end terminating at the rear end of the plug, a fishhook having a shank and eye fitting between the keel and the plug and extending through the keel and having a point disposed below the keel, a screw extending through the keel and the eye of the hook for removably securing the keel and the hook to the plug, and a screw extending through said upstanding end of the keel for connecting a tail to the plug.

3. In an artificial fish lure, the combination of a plug, a longitudinally extending keel on the bottom of the plug, a fishhook having a shank and eye fitting between the keel and the plug and extending through the keel and having a point disposed below the keel, a screw extending through the keel and the eye of the hook for removably securing the keel and the hook to the plug, and a downwardly extending weed-guard, having one of its ends secured to the plug by the keel.

4. In an artificial fish lure, the combination of a plug provided with a longitudinally extending recess on its under side, a longitudinally extending keel fitting in said recess and having its outer face substantially flush with the outer face of the plug, a fishhook having a shank and eye secured to the plug by the keel, the keel being provided with a slot, the shank of the hook extending through said slot, the hook having a point disposed downwardly of the keel, and a screw extending through the keel and removably securing the keel and the hook to the plug.

5. In an artificial fish lure, the combination of a plug provided with a longitudinally extending recess on its under side, a longitudinally extending keel fitting in said recess and having its outer face substantially flush with the outer face of the plug, the plug being provided with a groove and socket opening into the recess, a fishhook having a shank and eye fitting in said groove and socket, the keel being provided with a slot, the shank of the hook extending through said slot, the hook having a point disposed downwardly of the keel, and a screw extending through the keel and the eye of the hook for removably securing the keel and the hook to the plug.

6. In an artificial fish lure, the combination of a plug provided with a longitudinally extending recess on its under side, a longitudinally extending keel fitting in said recess and having its outer face substantially flush with the outer face of the plug, and an upstanding rear end terminating at the rear end of the plug, a fishhook having a shank and eye secured to the plug by the keel, the keel being provided with a slot, the shank of the hook extending through said slot, the hook having a point disposed downwardly of the keel, a screw extending through the keel and removably securing the keel and the hook to the plug, and a screw extending through the upstanding terminal of the keel for removably connecting a tail to the plug.

7. In an artificial fish lure, the combination of a body, a hook secured on the body, a tail comprising a transversely extending flat plate having an enlarged rear end, and a sheet of rubber wrapped around, and secured to, the portion of the plate in front of its enlarged rear end, and means for connecting the plate to the rear end of the body.

8. In an artificial fish lure, the combination of a plug provided with a longitudinally extending recess on its under side, a longitudinally extending keel fitting in said recess and having its outer face substantially flush with the outer face of the plug, the plug being provided with a groove and socket opening into the recess, a fishhook having a shank and eye fitting in said groove and socket, the shank of the hook extending through the keel, the hook having a point disposed downwardly of the keel, a weed-guard having a portion thereof between the keel and the eye of the hook and extending forwardly therefrom, and a screw extending through the keel and the eye of the hook and removably securing the keel, the weed-guard and the hook to the plug.

ANTHONY C. ACCETTA.